US012500236B2

(12) United States Patent
Lim et al.

(10) Patent No.: US 12,500,236 B2
(45) Date of Patent: Dec. 16, 2025

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Ra Na Lim, Cheongju-si (KR); A Reum Yang, Cheongju-si (KR); Gyun Joong Kim, Cheongju-si (KR); Kyung Min Lim, Cheongju-si (KR); Hye Bin Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 18/188,194

(22) Filed: Mar. 22, 2023

(65) Prior Publication Data

US 2023/0231128 A1    Jul. 20, 2023

Related U.S. Application Data

(63) Continuation of application No. PCT/KR2021/016130, filed on Nov. 8, 2021.

(30) Foreign Application Priority Data

Dec. 4, 2020 (KR) .................. 10-2020-0168858
May 25, 2021 (KR) .................. 10-2021-0067237
(Continued)

(51) Int. Cl.
*H01M 4/525* (2010.01)
*C01G 45/1228* (2025.01)
(Continued)

(52) U.S. Cl.
CPC ........ *H01M 4/525* (2013.01); *C01G 45/1228* (2013.01); *C01G 53/50* (2013.01);
(Continued)

(58) Field of Classification Search
None
See application file for complete search history.

(56) References Cited

U.S. PATENT DOCUMENTS

| 2013/0230780 A1 | 9/2013 | Park et al. | |
|---|---|---|---|
| 2016/0043396 A1* | 2/2016 | Sakai | C01G 45/1228 429/223 |
| 2016/0190555 A1* | 6/2016 | Kapylou | H01M 4/131 429/217 |

FOREIGN PATENT DOCUMENTS

| CN | 110120513 A | 8/2019 |
|---|---|---|
| EP | 2096692 A1 | 9/2009 |
| | (Continued) | |

OTHER PUBLICATIONS

English translation of Yasuda et al. (JP 2013/075773) (Year: 2013).*
(Continued)

*Primary Examiner* — Ronak C Patel
(74) *Attorney, Agent, or Firm* — Studebaker Brackett PLLC

(57) ABSTRACT

The present invention relates to a positive electrode active material and a lithium secondary battery including the same, and more particularly, to a positive electrode active material which includes a lithium-rich lithium manganese-based oxide containing at least lithium, nickel, manganese and molybdenum, wherein the lithium manganese-based oxide includes at least one primary particle and a molybdenum-containing flux is used to improve the crystal growth of the primary particle, resulting in mitigation and/or prevention of a decrease in stability caused by lithium and manganese present in excessive amounts in the lithium manganese-based oxide, and a lithium secondary battery including the same.

7 Claims, 3 Drawing Sheets

(30) Foreign Application Priority Data

| Jun. 21, 2021 | (KR) | 10-2021-0080132 |
|---|---|---|
| Jun. 21, 2021 | (KR) | 10-2021-0080133 |
| Oct. 18, 2021 | (KR) | 10-2021-0138123 |
| Oct. 27, 2021 | (KR) | 10-2021-0144259 |
| Oct. 28, 2021 | (KR) | 10-2021-0145310 |

(51) Int. Cl.

| C01G 53/50 | (2025.01) |
|---|---|
| H01B 1/08 | (2006.01) |
| H01M 4/131 | (2010.01) |
| H01M 4/36 | (2006.01) |
| H01M 4/505 | (2010.01) |
| H01M 10/052 | (2010.01) |
| H01M 4/02 | (2006.01) |

(52) U.S. Cl.
CPC .............. *H01B 1/08* (2013.01); *H01M 4/131* (2013.01); *H01M 4/366* (2013.01); *H01M 4/505* (2013.01); *H01M 10/052* (2013.01); *C01P 2002/01* (2013.01); *C01P 2004/04* (2013.01); *C01P 2006/40* (2013.01); *H01M 2004/021* (2013.01); *H01M 2004/028* (2013.01)

(56) References Cited

FOREIGN PATENT DOCUMENTS

| JP | 2008-305777 A | 12/2008 |
|---|---|---|
| JP | 2013-075773 A | 4/2013 |
| JP | 2013-080603 A | 5/2013 |
| JP | 2016-139569 A | 8/2016 |
| KR | 10-2014-0089851 A | 7/2014 |
| KR | 10-2015-0004645 A | 1/2015 |
| KR | 10-2015-0069334 A | 6/2015 |
| WO | 2007/116971 A1 | 10/2007 |
| WO | 2016/038983 A1 | 3/2016 |

OTHER PUBLICATIONS

English translation of Matsumoto (JP 2016/139569) (Year: 2016).*
English translation of Kaneda et al. (JP 2019/114327). (Year: 2019).*
English translation of Fujisawa et al. (JP 2007-299668). (Year: 2017).*
International Search Report issued in PCT/KR2021/016130; mailed Feb. 21, 2022.
An Office Action; "Notice of Reasons for Refusal," mailed by the Japanese Patent Office on Jun. 4, 2024, which corresponds to Japanese Patent Application No. 2023-520050 and is related to U.S. Appl. No. 18/188,194.

* cited by examiner

POSITIVE ELECTRODE ACTIVE MATERIAL AND LITHIUM SECONDARY BATTERY INCLUDING THE SAME

CROSS-REFERENCE TO RELATED APPLICATION

This application is based on the PCT Application No. PCT/KR2021/016130, filed on Nov. 8, 2021, and claims the benefit of priority from the prior Korean Patent Application No. 10-2020-0168858, filed on Dec. 4, 2020, Korean Patent Application No. 10-2021-0067237, filed on May 25, 2021, Korean Patent Application No. 10-2021-0080132, filed on Jun. 21, 2021, Korean Patent Application No. 10-2021-0080133, filed on Jun. 21, 2021, Korean Patent Application No. 10-2021-0138123, filed on Oct. 18, 2021, Korean Patent Application No. 10-2021-0144259, filed on Oct. 27, 2021, and Korean Patent Application No. 10-2021-0145310, filed on Oct. 28, 2021, the disclosures of which are incorporated herein by reference in its entirety.

TECHNICAL FIELD

The present invention relates to a positive electrode active material and a lithium secondary battery including the same, and more particularly, to a positive electrode active material which includes a lithium-rich lithium manganese-based oxide containing at least lithium, nickel, manganese and molybdenum, wherein the lithium manganese-based oxide includes at least one primary particle and a molybdenum-containing flux is used to improve the crystal growth of the primary particle, resulting in mitigation and/or prevention of a decrease in stability caused by lithium and manganese present in excessive amounts in the lithium manganese-based oxide, and a lithium secondary battery including the same.

BACKGROUND ART

Batteries store electrical power by using materials facilitating an electrochemical reaction at a positive electrode and a negative electrode. As a representative example of such batteries, there is a lithium secondary battery storing electrical energy by means of a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging a liquid organic electrolyte or a polymer electrolyte between the positive electrode and the negative electrode. As a positive electrode active material of the lithium secondary battery, a lithium composite oxide may be used, and for example, composite oxides such as $LiCoO_2$, $LiMn_2O_4$, $LiNiO_2$, $LiMnO_2$, or a composite oxide in which Ni, Co, Mn or Al is complexed as disclosed in Korean Patent Application Publication No. 10-2015-0069334 (published Jun. 23, 2015) are being studied.

Among the positive electrode active materials, $LiCoO_2$ is most widely used due to excellent lifetime characteristics and charge/discharge efficiency, but it is expensive due to cobalt being a limited resource, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated. Since most of the Li by-products consist of LiOH and $Li_2CO_3$, they may cause gelation in preparation of a positive electrode paste or cause gas generation according to repeated charge/discharge after the manufacture of an electrode. Residual $Li_2CO_3$ not only increases cell swelling to reduce the number of cycles, but also causes the swelling of a battery.

Various candidate materials for compensating for conventional positive electrode active materials are being mentioned.

For example, studies are being conducted to use a lithium-rich lithium manganese-based oxide as a positive electrode active material for a lithium secondary battery, in which an excess of Mn among transition metals is included and a lithium content is larger than the sum of the contents of the transition metals. The lithium-rich lithium manganese-based oxide is also referred to as an overlithiated layered oxide (OLO).

Although the OLO has an advantage in that it can theoretically exhibit high capacity under a high voltage operation environment, in fact, due to an excessive amount of Mn contained in the oxide, the electrical conductivity is relatively low, and thus the rate capability of a lithium secondary battery using OLO is low. As such, when the rate capability is low, there is a problem in which charge/discharge capacity and lifespan efficiency (cycling capacity retention) are degraded during the cycling of a lithium secondary battery.

In addition, during the cycling of a lithium secondary battery using OLO, a decrease in charge/discharge capacity or voltage decay may be caused by a phase transition caused by the migration of a transition metal in the lithium manganese-based oxide. For example, when a transition metal in a lithium manganese-based oxide having a layered crystal structure migrates in an unintended direction to induce phase transition, spinel or a crystal structure similar thereto may be generated entirely and/or partially in the lithium manganese-based oxide.

To solve the above-described problems, although there are attempts to improve the problems of OLO through structural improvement and surface modification of particles, such as controlling the particle size of OLO or coating the surface of OLO, these attempts do not reach the level of commercialization.

DISCLOSURE

Technical Problem

In the lithium secondary battery market, the growth of lithium secondary batteries for electric vehicles is driving the market, and accordingly, the demand for positive electrode active materials used in lithium secondary batteries is also continuously increasing.

For example, conventionally, to ensure stability, lithium secondary batteries using LFP have mainly been used, but recently, the use of a nickel-based lithium composite oxide having a larger energy capacity per weight than LFP tends to be increasing.

In addition, recently, nickel-based lithium composite oxides mainly used as positive electrode active materials for high-capacity lithium secondary batteries essentially use three-component metal elements such as nickel, cobalt and manganese or nickel, cobalt and aluminum. However, since cobalt is not only unstable in supply, but also excessively expensive compared to other raw materials, a positive electrode active material with a new composition, which can reduce a cobalt content or exclude cobalt is needed.

Considering the aspects, a lithium-rich lithium manganese-based oxide can meet the above-mentioned expectations of the market, it can be said that the electrochemical characteristics and stability of the lithium manganese-based oxide are still insufficient to replace the commercially available NCM or NCA-type positive electrode active material.

However, compared to other types of commercially available positive electrode active materials, even when the existing lithium-rich lithium manganese-based oxides are disadvantageous in terms of electrochemical properties and/or stability, it was confirmed by the present inventors that, when it is possible to control the concentration of a transition metal in the lithium manganese-based oxide by region, a lithium-rich lithium manganese-based oxide can also exhibit commercially available levels of electrochemical properties and stability.

Accordingly, the present invention is directed to providing a positive electrode active material which includes a lithium-rich lithium manganese-based oxide containing at least lithium, nickel, manganese and molybdenum, and a molybdenum-containing flux is used to induce crystal growth such that the average particle diameter of a primary particle in the lithium manganese-based oxide is 0.4 μm or more, resulting in mitigation and/or prevention of a decrease in charge/discharge capacity or voltage decay during the cycling of a lithium secondary battery using the positive electrode active material including the lithium manganese-based oxide.

The present invention is also directed to providing a positive electrode active material, in which a molybdenum-containing flux is used to promote the crystal growth of a primary particle of the lithium manganese-based oxide and some of the molybdenum is present in the form of an oxide on the surface of the primary particle, resulting in mitigation and/or prevention of the degradation in charge-transfer and/or diffusion (i.e., surface kinetics) of Li ions on the surface of the primary particle due to an increase in the average particle diameter of the primary particle in the lithium manganese-based oxide.

Moreover, the present invention is directed to providing a lithium secondary battery which improves a low discharge capacity of the conventional OLO by using a positive electrode including the positive electrode active material defined in the present invention.

Technical Solution

To solve the above-described technical problems, one aspect of the present invention provides a positive electrode active material, which includes a lithium-rich lithium manganese-based oxide containing at least lithium, nickel, manganese and molybdenum, wherein the lithium manganese-based oxide includes at least one primary particle, and the average particle diameter of the primary particle in the lithium manganese-based oxide is 0.4 to 3.0 μm.

Wherein, the lithium manganese-based oxide includes a primary particle whose crystal growth is promoted using a molybdenum-containing flux.

Wherein, some of the molybdenum contained in the flux may be present as a dopant in the primary particle.

In one embodiment, the lithium manganese-based oxide may be represented by Formula 1 below.

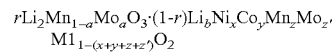

$rLi_2Mn_{1-a}Mo_aO_3 \cdot (1-r)Li_bNi_xCo_yMn_zMo_{z'}$
$M1_{1-(x+y+z+z')}O_2$  [Formula 1]

Wherein,

M1 is at least one selected from Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0<r\leq0.7$, $0\leq a<0.2$, $0<b\leq1$, $0<x\leq1$, $0\leq y<1$, $0<z<1$, $0<z'<0.2$, and $0<x+y+z+z'\leq1$.

As shown in Formula 1, molybdenum present in the lithium manganese-based oxide may be present as a dopant in $rLi_2Mm_{1-a}Mo_aO_3$ corresponding to a C2/m phase and/or $(1-r)Li_bNi_xCo_yMn_zMo_{z'}M1_{1-(x+y+z+z')}O_2$ corresponding to an R3-m phase.

As the average particle diameter of primary particles in the lithium manganese-based oxide increases due to the presence of some of the molybdenum used as a flux for the crystal growth of a primary particle constituting the lithium manganese-based oxide is present as a dopant in the lithium manganese-based oxide, it may induce the electrical activation of, particularly, $rLi_2Mm_{1-a}Mo_aO_3$ corresponding to the C2/m phase, which contains excessive amounts of lithium and manganese, among the lithium manganese-based oxide.

In addition, as the average particle diameter of primary particles in the lithium manganese manganese-based oxide increases due to the presence of some of the molybdenum used as a flux for the crystal growth of a primary particle constituting the lithium manganese-based oxide in the form of an oxide on the surface of the primary particle, the degradation in charge-transfer and/or diffusion (i.e., surface kinetics) of Li ions on the surface of the primary particle may be mitigated and/or prevented.

In addition, another aspect of the present invention provides a positive electrode including the above-described positive electrode active material.

Moreover, still another aspect of the present invention provides a lithium secondary battery using the above-described positive electrode.

Advantageous Effects

According to the present invention, it is possible to improve the limitations of a conventional lithium-rich lithium manganese-based oxide that has several disadvantages in terms of electrochemical properties and/or stability, compared with different types of commercially available positive electrode active materials.

Specifically, as the crystal growth is promoted in the lithium manganese-based oxide according to the present invention using a flux containing molybdenum, a decrease in charge/discharge capacity or voltage decay during the cycling of a lithium secondary battery including the lithium manganese-based oxide as a positive electrode active material can be mitigated or resolved.

In addition, as some of the molybdenum used as a flux for the crystal growth of a primary particle constituting the lithium manganese-based oxide are present as a dopant in the lithium manganese-based oxide, it may induce the electrical activation of, particularly, $rLi_2Mn_{1-a}Mo_aO_3$ corresponding to a C2/m phase, which contains excessive amounts of lithium and manganese, among the lithium manganese-based oxide, resulting in an improvement of discharge characteristics such as a discharge average voltage retention and a discharge capacity ratio of a lithium secondary battery using the lithium manganese-based oxide as a positive electrode active material.

In addition, as the average particle diameter of primary particles in the lithium manganese-based oxide increases due to the presence of some of the molybdenum used as a flux for the crystal growth of a primary particle constituting the lithium manganese-based oxide in the form of an oxide on the surface of the primary particle, the degradation in charge-transfer and/or diffusion (i.e., surface kinetics) of Li ions on the surface of the primary particle may be mitigated and/or prevented.

MODES OF THE INVENTION

Figure 1:
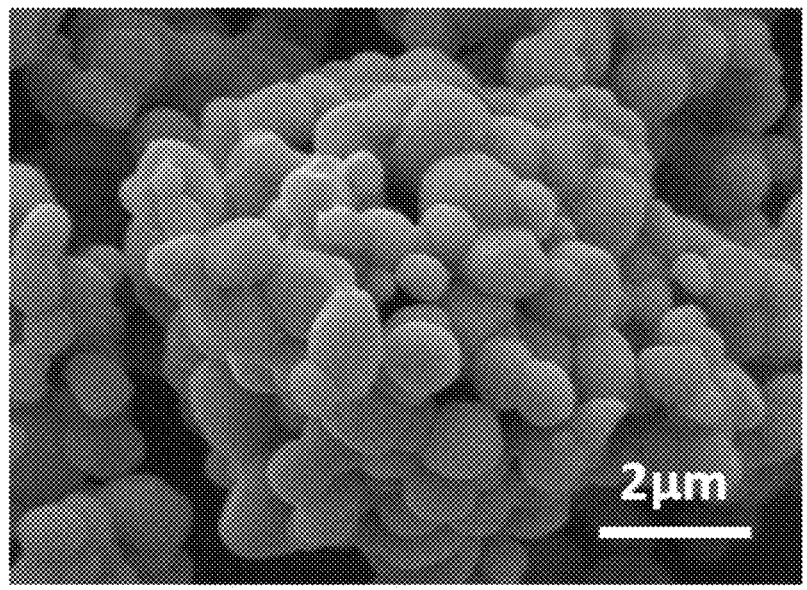
FIG. 1 is an SEM image of a lithium manganese oxide-based included in a positive electrode active material according to Example 1.

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material including a lithium-rich lithium manganese-based oxide containing at least lithium, nickel, manganese and doping metals and a lithium secondary battery including the positive electrode active material according to the present invention will be described in further detail.
Positive Electrode Active Material According to one aspect of the present invention, a positive electrode active material including a lithium-rich lithium manganese-based oxide containing at least lithium, nickel, manganese and doping metals is provided. The lithium manganese-based oxide is a composite metal oxide capable of intercalation/deintercalation of lithium ions.

The lithium manganese-based oxide included in the positive electrode active material defined herein may be a secondary particle including at least one primary particle. When the lithium manganese-based oxide includes a particle formed by aggregating a plurality of primary particles, the particle that is formed by aggregating a plurality of the primary particles may be referred to as a secondary particle.

Wherein, the "particle including at least one primary particle" should be interpreted to include a "particle formed by aggregating a plurality of primary particles" or a "non-aggregated particle including a single primary particle."

Wherein, it is preferable that the smaller the number of primary particles constituting a whole particle, the larger the size of the primary particle.

The primary particle and the secondary particle may each independently have a rod shape, an oval shape and/or an irregular shape.

Wherein, the average particle diameter of the primary particles in the lithium manganese-based oxide including at least one primary particle is preferably 0.4 to 3.0 μm. The average particle diameter of the primary particles may be measured as the length of the major or minor axis of the primary particles or as a cumulative average particle size.

Generally, in the case of OLOs in the form of a secondary particle formed by aggregating a plurality of primary particles, unlike conventional OLOs in which the average particle diameter of the primary particles is merely several to tens of nanometers, as the primary particles in the lithium manganese-based oxide defined in the present invention have an average particle diameter of at least 0.4 μm, a phase transition effect caused by the migration of a transition metal between particles is reduced, and thus it is possible to mitigate and/or prevent a decrease in charge/discharge capacity or voltage decay during the cycling of a lithium secondary battery using a positive electrode active material including the lithium manganese-based oxide.

While there are several possible ways to promote the crystal growth of the primary particle in the lithium manganese-based oxide, according to the present invention, the average particle diameter of the primary particles constituting the lithium manganese-based oxide may indicate crystal growth promoted using a molybdenum-containing flux. When the crystal growth of the primary particles is promoted using a molybdenum-containing flux, some of the molybdenum used as the flux may be present as a dopant in the primary particle.

On the other hand, when the average particle diameter of the primary particles in the lithium manganese-based oxide is increased by simply increasing a roasting or calcination temperature in the process of preparing the lithium manganese-based oxide to promote the crystal growth of the particles, a phase transition effect caused by the migration of a transition metal between particles may not be sufficiently prevented, or the charge-transfer and/or diffusion (i.e., surface kinetics) of Li ions on the particle surface may be rather degraded due to a greater than necessary increase in the size of a primary particle.

When the average particle diameter of the primary particles is smaller than 0.4 μm, it may be difficult to sufficiently mitigate or resolve a decrease in charge/discharge capacity or voltage decay during cycling of a lithium secondary battery including the lithium manganese-based oxide as a positive electrode active material. On the other hand, when the average particle diameter of the primary particles is larger than 3.0 μm, as the average particle diameter of the primary particles excessively increases, the charge-transfer and/or diffusion (i.e., surface kinetics) of Li ions on the surface of the primary particle may be degraded, and thus the initial charge/discharge capacity may be rapidly reduced.

The average particle diameter of the secondary particles may vary according to the number of primary particles constituting the secondary particle, but may generally be 1 to 30 μm.

The lithium manganese-based oxide defined herein may be represented by Formula 1 below.

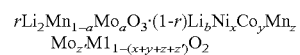   [Formula 1]

Wherein,

M1 is at least one selected from Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si and Bi, $0 < r \leq 0.7$, $0 \leq a < 0.2$, $0 < b \leq 1$, $0 < x \leq 1$, $0 \leq y < 1$, $0 < z < 1$, $0 < z' < 0.2$, and $0 < x+y+z+z' \leq 1$.

The lithium manganese-based oxide represented by Formula 1 may optionally include cobalt. In addition, when the lithium manganese-based oxide includes cobalt, the ratio of the number of moles of cobalt to the number of moles of all metal elements in the lithium manganese-based oxide may be 10% or less, and preferably 5% or less. On the other hand, the lithium manganese-based oxide represented by Formula 1 may not include cobalt.

The lithium manganese-based oxide represented by Formula 1 is a composite oxide in which oxides of a phase belonging to a C2/m space group represented by $rLi_2Mn_{1-a}Mo_aO_3$ (hereinafter, referred to as a 'C2/m phase') and a phase belonging to an R3-m space group represented by $(1-r)Li_bNi_xCo_yMn_zMo_{z'}M1_{1-(x+y+z+z')}O_2$ (hereinafter, referred to as an 'R3-m phase') coexist. Wherein, the C2/m phase oxide and the R3-m phase oxide are present in a state of forming a solid solution.

In the lithium manganese-based oxide represented by Formula 1, when r is more than 0.8, there is a concern that the discharge capacity of a positive electrode active material may decrease due to an excessively high proportion of $Li_2MnO_3$, which is a C2/m phase oxide, among the lithium manganese-based oxide. In other words, in order to improve surface kinetics by sufficiently activating a C2/m phase oxide, which has relatively high resistance, among the lithium manganese-based oxide, it is preferable that an R3-m phase oxide is present in a predetermined proportion or more.

Based on all metal elements except lithium in the lithium manganese-based oxide represented by Formula 1, molybdenum is preferably present within a range of 0.02 to 5.0 mol %.

A content of molybdenum that is smaller than 0.02 mol % based on all metal elements except lithium in the lithium manganese-based oxide means an insufficient amount of a molybdenum-containing flux used for the crystal growth of a primary particle constituting the lithium manganese-based oxide and an insignificant crystal growth effect of the primary particle by the molybdenum-containing flux.

On the other hand, when the content of molybdenum in the lithium manganese-based oxide is excessively large, there is a concern that the discharge capacity of a positive electrode active material is reduced due to a decrease in the content of an active metal element in the lithium manganese-based oxide.

When the amount of a molybdenum-containing flux used for the crystal growth of a primary particle constituting the lithium manganese-based oxide is insufficient, the average particle diameter of primary particles constituting the lithium manganese-based oxide is smaller than 0.4 μm, or the proportion of the primary particles having a particle diameter of smaller than 0.4 μm in the lithium manganese-based oxide may increase.

Accordingly, a phase transition caused by the unintended migration of a transition metal between particles in the lithium manganese-based oxide may be induced, resulting in the entire and/or partial generation of a spinel or another structure similar thereto in the lithium manganese-based oxide.

The occurrence of the phase transition in the lithium manganese-based oxide acts as a major cause of a decrease in charge/discharge capacity or voltage decay during the cycling of a lithium secondary battery using a positive electrode active material including the lithium manganese-based oxide.

A content of molybdenum being larger than 5.0 mol % based on all metal elements except lithium in the lithium manganese-based oxide means an excessively large amount of a molybdenum-containing flux used for the crystal growth of a primary particle constituting the lithium manganese-based oxide.

In this case, as the crystal growth of a primary particle is unnecessarily increased by the molybdenum-containing flux used in excess, the charge-transfer and/or diffusion (i.e., surface kinetics) of Li ions on the surface of the primary particle may be degraded.

In addition, as the content of molybdenum in the lithium manganese-based oxide increases, the proportion of an active metal element which can contribute to improvement in the initial charge/discharge capacity of a lithium secondary battery using the lithium manganese-based oxide as a positive electrode active material may be reduced.

Meanwhile, even when the crystal growth of a primary particle is promoted using the molybdenum-containing flux, the press density of the positive electrode active material under a pressure of 4.5 tons may be 2.8 g/cc or more.

When the size of a primary particle in the lithium manganese-based oxide is excessively small or large, the structural stability of the positive electrode active material may be lowered. In addition, when the porosity in the secondary particle is increased by an increase in the size of a primary particle in the lithium manganese-based oxide, the structural stability of the positive electrode active material may be lowered.

However, as described above, the positive electrode active material according to the present invention may prevent the degradation in the structural stability of the positive electrode active material as the average particle diameter of primary particles promoting crystal growth using a molybdenum-containing flux is allowed to be within 0.4 to 3.0 μm.

Meanwhile, in another embodiment, at least one metal oxide represented by Formula 2 below may be present on at least a part of the surface of the lithium manganese-based oxide. Wherein, the region where the metal oxide is present may be at least a part of the surface of the primary particle and/or the secondary particle.

$$Li_dM2_eO_f \quad \text{[Formula 2]}$$

Wherein,

M2 is at least one selected from Ni, Mn, Co, Fe, Cu, Nb, Mo, Ti, Al, Cr, Zr, Zn, Na, K, Ca, Mg, Pt, Au, P, Eu, Sm, W, Ce, V, Ba, Ta, Sn, Hf, Gd and Nd, $0 \leq d \leq 8$, $0 < e \leq 8$, and $2 \leq f \leq 13$.

The metal oxide represented by Formula 2 may be formed by a reaction of at least a part of metal elements (nickel, manganese, cobalt and/or a doping metal) constituting a lithium manganese-based oxide with Li present on the surface of the lithium manganese-based oxide.

The metal oxide may reduce a lithium-containing impurity (or residual lithium) present on the surface of the lithium manganese-based oxide and also improve the electrochemical properties of the lithium manganese-based oxide by acting as a diffusion path for lithium ions.

In addition, the metal oxide may include at least one selected from molybdenum oxide and lithium molybdenum oxide.

As the average particle diameter of primary particles in the lithium manganese-based oxide increases due to the presence of some of the molybdenum used as a flux for the crystal growth of a primary particle constituting the lithium manganese-based oxide in the form of an oxide on the surface of the primary particle, the degradation in charge-transfer and/or diffusion (i.e., surface kinetics) of Li ions on the surface of the primary particle may be mitigated and/or prevented.

When the lithium manganese-based oxide is a core-shell particle, the metal oxide may also be present in the form of being integrated with the shell.

Accordingly, the metal oxide may be present on at least a part of the surface of a crystallite, a primary particle and/or a secondary particle, which constitute(s) a lithium manganese-based oxide.

The metal oxide is an oxide in which lithium and an element represented by M2 are complexed, or an oxide of M3, and may be, for example, $Li_aW_bO_c$, $Li_aZr_bO_c$, $Li_aTi_bO_c$, $Li_aNi_bO_c$, $Li_aCo_bO_c$, $Li_aAl_bO_c$, $Li_aMo_bO_c$, $Co_bO_c$, $Al_bO_c$, $W_bO_c$, $Zr_bO_c$ or $Ti_bO_c$. However, the above examples are merely provided to help understanding, and the metal oxide defined herein is not limited thereto.

In addition, the metal oxide may be an oxide in which lithium and at least two elements represented by M2 are complexed, or may further include an oxide in which lithium and at least two elements represented by M2 are complexed. The oxide in which lithium and at least two elements represented by M2 are complexed may be, for example, $Li_a(W/Ti)_bO_c$, $Li_a(W/Zr)_bO_c$, $Li_a(W/Ti/Zr)_bO_c$, or $Li_a(W/Ti/B)_bO_c$, but the present invention is not limited thereto.

Lithium Secondary Battery

According to another aspect of the present invention, a positive electrode including a positive electrode current collector and a positive electrode active material layer formed on the positive electrode current collector may be provided. Wherein, the positive electrode active material layer may include the above-described positive electrode active material prepared by a preparation method according to various embodiments of the present invention as a positive electrode active material.

Accordingly, a detailed description of the lithium manganese-based oxide will be omitted, and only the remaining components not described above will be described below. In addition, hereinafter, the above-described lithium manganese-based oxide is referred to as a positive electrode active material for convenience.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may typically have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Wherein, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to manufacture a positive electrode.

In addition, in another exemplary embodiment, the positive electrode may be manufactured by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Wherein, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 pin, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte wettability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte may exhibit excellent performance The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Wherein, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric vehicle field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to still another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to exemplify the present invention, and thus the scope of the present invention will not be construed not to be limited by these examples.

Preparation Example 1. Preparation of Positive Electrode Active Material

Example 1

(a) Preparation of Precursor

In a reactor, NaOH and $NH_4OH$ were added to a mixed aqueous solution in which $NiSO_4 \cdot 6H_2O$ and $MnSO_4 \cdot H_2O$ are mixed in a molar ratio of 40:60 and stirred. The temperature in the reactor was maintained at 45° C., and $N_2$ gas was introduced into the reactor while a precursor synthesis reaction proceeded. After the reaction was completed, washing and dehydration were performed, thereby obtaining a hydroxide precursor of the composition of $Ni_{0.4}Mn_{0.6}(OH)_2$.

(b) First Thermal Treatment

A precursor in an oxide state was obtained by increasing the temperature of a calcination furnace with an $O_2$ atmosphere at a rate of 2° C./min and maintaining the temperature at 550° C., thermally treating the hydroxide precursor obtained in (a) for 5 hours, and then performing furnace cooling.

(c) Second Thermal Treatment

A mixture was prepared by mixing the oxide-state precursor obtained in (b) with LiOH (Li/(metals except Li) mol ratio=1.3) as a lithium compound and 0.5 mol % $MoO_3$ based on all metal elements in the precursor.

Subsequently, after increasing the temperature of a calcination furnace with an $O_2$ atmosphere at a rate of 2° C./min, and maintaining the temperature at 1,000° C., the mixture was thermally treated for 8 hours and subjected to furnace cooling, thereby finally obtaining a positive electrode active material including a lithium manganese-based oxide.

Example 2

A positive electrode active material was prepared in the same manner as in Example 1, except that 6.0 mol % $MoO_3$ was used in (c).

Example 3

A positive electrode active material was prepared in the same manner as in Example 1, except that 0.01 mol % $MoO_3$ was used in (c).

Comparative Example 1

A positive electrode active material was prepared in the same manner as in Example 1, except that $MoO_3$ was not used in (c).

Comparative Example 2

(a) Preparation of Precursor

In a reactor, NaOH and $NH_4OH$ were added to a mixed aqueous solution in which $NiSO_4·6H_2O$ and $MnSO_4·H_2O$ are mixed in a molar ratio of 40:60 and stirred. The temperature in the reactor was maintained at 45° C., and $N_2$ gas was introduced into the reactor while a precursor synthesis reaction proceeded. After the reaction was completed, washing and dehydration were performed, thereby obtaining a hydroxide precursor of the composition $Ni_{0.4}Mn_{0.6}(OH)_2$.

(b) First Thermal Treatment

A precursor in an oxide state was obtained by increasing the temperature of a calcination furnace with an $O_2$ atmosphere at a rate of 2° C./min and maintaining the temperature at 800° C., thermally treating the hydroxide precursor obtained in (a) for 5 hours, and then performing furnace cooling.

(c) Second Thermal Treatment

A mixture was prepared by mixing the precursor in an oxide state obtained in (b) with LiOH (Li/(metals except Li) mol ratio=1.3) as a lithium compound.

Subsequently, after increasing the temperature of a calcination furnace with an $O_2$ atmosphere at a rate of 2° C./min and maintaining the temperature at 1,000° C., the mixture was thermally treated for 8 hours and subjected to furnace cooling, thereby finally obtaining a positive electrode active material including a lithium manganese-based oxide.

Comparative Example 3

A positive electrode active material was prepared in the same manner as in Example 1, except that 0.5 mol % $Nb_2O_3$, instead of 0.5 mol % $MoO_3$, was used in (c).

Preparation Example 2. Manufacture of Lithium Secondary Battery

A positive electrode slurry was prepared by dispersing 90 wt % of each of the positive electrode active materials prepared according to Preparation Example 1, 5.5 wt % of carbon black, and 4.5 wt % of a PVDF binder in 30 g of N-methyl-2 pyrrolidone (NMP). The positive slurry was uniformly applied on an aluminum thin film with a thickness of 15 μm and dried in vacuum at 135° C., thereby manufacturing a positive electrode for a lithium secondary battery.

Lithium foil was used as a counter electrode against the positive electrode, a porous polyethylene film (Celgard 2300, thickness: 25 μm) was used as a separator, and a liquid electrolyte prepared by adding $LiPF_6$ at 1.15M in a solvent in which ethylene carbonate and ethyl methyl carbonate were mixed in a volume ratio of 3:7 was used, thereby manufacturing a coin cell.

Figure 2:
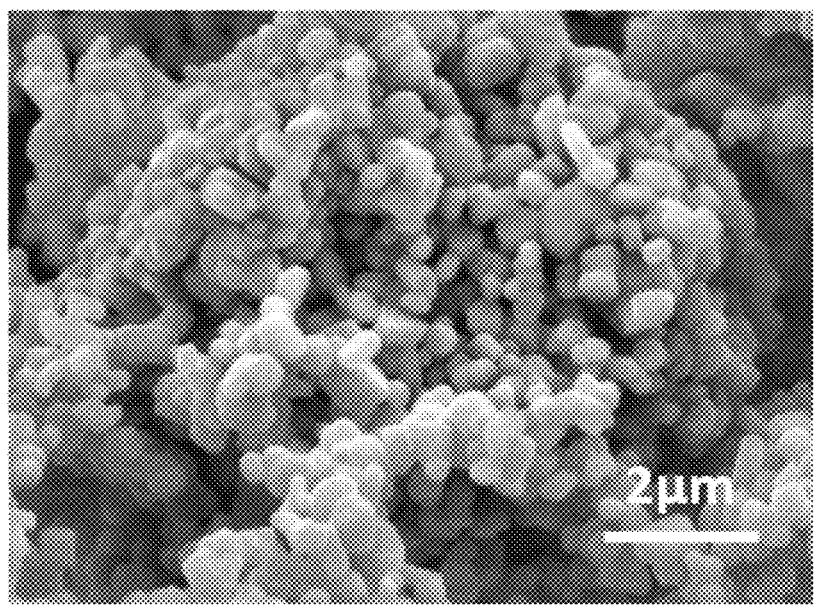
FIG. 2 is an SEM image of a lithium manganese oxide-based included in a positive electrode active material according to Comparative Example 1.
Figure 3:
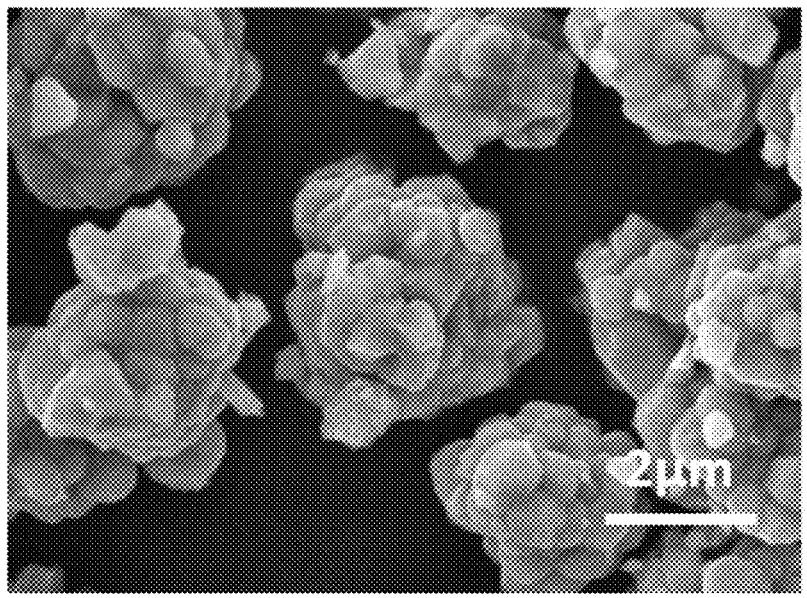
FIG. 3 is an SEM image of a lithium manganese oxide-based included in a positive electrode active material according to Comparative Example 2.

Experimental Example 1. Analysis of Physical Properties of Positive Electrode Active Material A lithium manganese-based oxide was selected from each of the positive electrode active materials prepared according to Preparation Example 1, and photographed with a scanning electron microscope to obtain an SEM image. FIGS. 1 to 3 show the SEM images of lithium manganese-based oxides included in the positive electrode active materials according to Example 1, Comparative Example 1, and Comparative Example 2.

One hundred primary particles were selected from each of the SEM images of the lithium manganese-based oxides included in the positive electrode active materials according to Examples 1 to Example 3, and Comparative Examples 1 and 3 using an image analyzer program, the average particle diameter of the primary particles in each sample was measured, and then the average value thereof was calculated.

Subsequently, after weighing 3 g of each positive electrode active material prepared according to Preparation Example 1 in a pelletizer, the resulting positive electrode active material was pressurized under 4.5 tons for 5 seconds, and then a press density was measured.

The measurement result is shown in Table 1 below.

TABLE 1

| Classification | Average particle diameter of primary particles (μm) | Press density (g/cc) |
|---|---|---|
| Example 1 | 0.9 | 2.8 |
| Example 2 | 0.7 | 2.7 |
| Example 3 | 0.5 | 2.6 |
| Comparative Example 1 | 0.3 | 2.6 |
| Comparative Example 2 | 0.8 | 2.8 |
| Comparative Example 3 | 0.8 | 2.8 |

Experimental Example 2. Analysis of Composition of Positive Electrode Active Material After selecting the lithium manganese-based oxide from the positive electrode active material according to Example 1, the lithium composite oxide was subjected to cross-sectional treatment using FIB (Ga-ion source), and then photographed using a scanning electron microscope to obtain a cross-sectional SEM image.

Subsequently, through EDX analysis of the lithium manganese-based oxide confirmed from the cross-sectional SEM image, molybdenum, which is a target transition metal present inside and on the surface of a primary particle was mapped.

Figure 4:
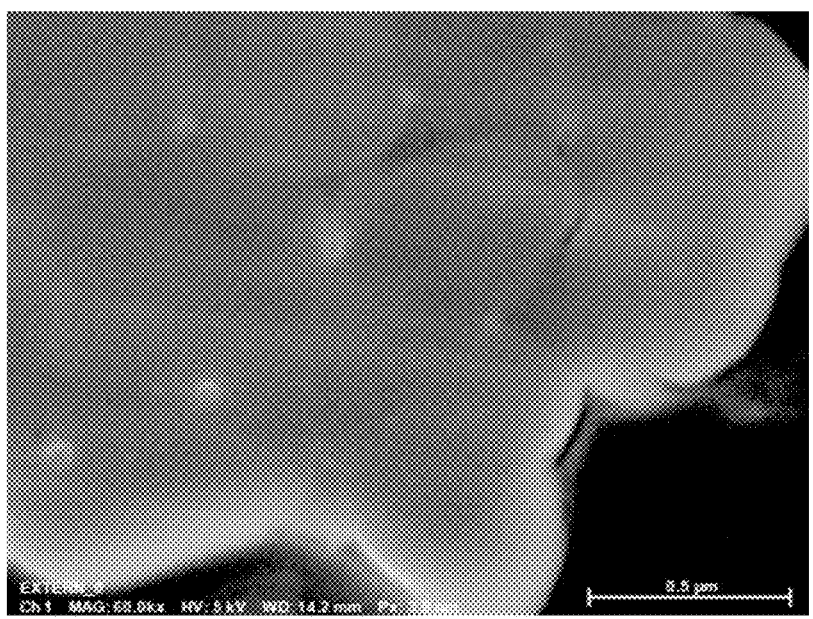
FIG. 4 is a cross-sectional SEM image of a lithium manganese-based oxide included in a positive electrode active material according to Example 1.
Figure 5:
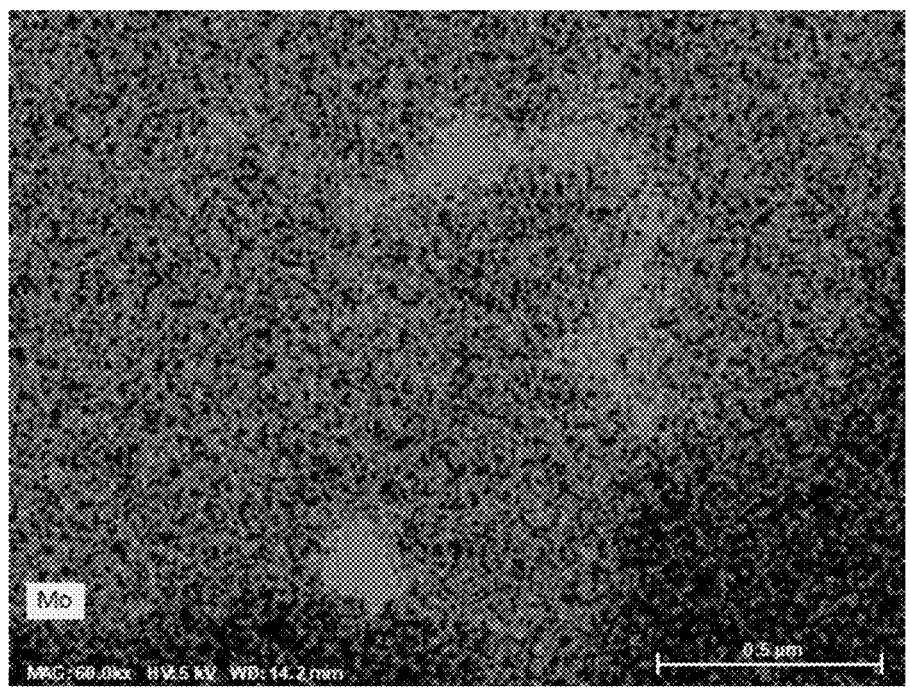
FIG. 5 is an image obtained by mapping molybdenum to the cross-sectional SEM image of FIG. 4 through EDX analysis.

FIG. 4 is a cross-sectional SEM image of a lithium manganese-based oxide included in a positive electrode active material according to Example 1, and FIG. 5 is an image obtained by mapping molybdenum to the cross-sectional SEM image of FIG. 4 (region with high density of shading) through EDX analysis.

Referring to FIG. 5, it can be confirmed that molybdenum is present on at least a part of the surface of a primary particle constituting the lithium manganese-based oxide. The above result means that some of the $MoO_3$ used as a flux for the crystal growth of a primary particle is present on the surface of the primary particle as molybdenum oxide and/or lithium molybdenum oxide.

In addition, also in the region corresponding to the inside of a primary particle constituting the lithium manganese-based oxide, there is a region partially mapped in red, meaning that molybdenum derived from $MoO_3$ used as a flux for the crystal growth of a primary particle is present as a dopant in the primary particle.

Experimental Example 3. Evaluation of Electrochemical Properties of Lithium Secondary Battery A charging/discharging experiment was performed on each of the lithium secondary batteries (coin cells) manufactured in Preparation Example 2 using an electrochemical analyzer (Toyo, Toscat-3100) at 25° C. in a voltage range of 2.0V to 4.6V at a discharge rate of 0.1 C to 5.0 C to measure an initial charge capacity, an initial discharge capacity, an initial reversible efficiency, and a discharge capacity ratio (rate capability (C-rate)).

In addition, after 50 cycles of charging/discharging the same lithium secondary battery at 25° C. in operating voltage range of 2.0V to 4.6V under a condition of 1 C/1 C, a cycle capacity retention at the 50$^{th}$ cycle with respect to the initial capacity and an average discharge voltage retention at the 50$^{th}$ cycle with respect to the average discharge voltage at the first cycle were measured.

The measurement results are shown in Tables 2 and 3 below.

TABLE 2

| Units | Classification | | |
|---|---|---|---|
| | Initial charge capacity (0.1 C-rate) mAh/g | Initial discharge capacity (0.1 C-rate) mAh/g | Initial reversible efficiency % |
| Example 1 | 259.6 | 210.0 | 81 |
| Example 2 | 255.3 | 204.5 | 80 |
| Example 3 | 251.5 | 203.0 | 81 |
| Comparative Example 1 | 250.9 | 202.8 | 81 |
| Comparative Example 2 | 211.7 | 175.6 | 83 |
| Comparative Example 3 | 235.2 | 187.0 | 80 |

TABLE 3

| Units | Classification | | | | |
|---|---|---|---|---|---|
| | Discharge capacity (1 C-rate) mAh/g | Cycle capacity retention (1 C-rate, 50 cycles) % | Average discharge voltage retention % | Discharge capacity ratio (2 C/0.1 C) % | Discharge capacity ratio (5 C/0.1 C) % |
| Example 1 | 175.0 | 87 | 98 | 74 | 63 |
| Example 2 | 162.5 | 86 | 96 | 71 | 56 |
| Example 3 | 162.0 | 86 | 97 | 72 | 58 |
| Comparative Example 1 | 160.9 | 85 | 96 | 69 | 55 |
| Comparative Example 2 | 112.6 | 66 | 91 | 41 | 18 |
| Comparative Example 3 | 140.5 | 86 | 93 | 67 | 51 |

Referring to the results in Tables 2 and 3, it can be confirmed that the positive electrode active materials according to Examples 1 to 3 are improved in discharge characteristics such as an initial discharge capacity and a discharge capacity ratio by promoting the crystal growth of a primary particle using a molybdenum-containing flux, compared to the positive electrode active material according to Comparative Example 1.

When comparing the positive electrode active materials according to Examples 1 to 3, in the case of Example 3 using a relatively small amount of flux containing molybdenum, the degree of crystal growth of a primary particle is lower than that of the positive electrode active material according to Example 1, confirming that a discharge capacity (1 C-rate) and a discharge capacity ratio (5 C/0.1 C) are slightly lower than those of the lithium secondary battery using the positive electrode active material according to Example 1.

In addition, in the case of Example 2 using a relatively large amount of flux containing molybdenum, the degree of crystal growth is not much different from that of the positive electrode active material of Example 1, but rather, as the amount of the flux used increases, it can be confirmed that the discharge capacity (1 C-rate) and the discharge capacity ratio (5 C/0.1 C) are slightly lower than those of the lithium secondary battery using the positive electrode active material according to Example 1. It is assumed that this result is because the content of an active metal element in the lithium manganese-based oxide is reduced due to an increase in content of molybdenum remaining in the lithium manganese-based oxide.

Meanwhile, in the case of a lithium secondary battery using the positive electrode active material according to Comparative Example 2 including a primary particle in which crystal growth is promoted by increasing the temperature for the second thermal treatment instead of using a separate flux, it can be confirmed that it exhibits an initial discharge capacity and an initial heating efficiency similar to those of the positive electrode active materials according to Examples 1 to 3. However, it can be confirmed that the cycling capacity retention and discharge capacity ratio of the lithium secondary battery using the positive electrode active material according to Comparative Example 2 are lower than those of the lithium secondary batteries using the positive electrode active materials according to Examples 1 to 3.

In addition, in the case of a lithium secondary battery using the positive electrode active material according to Comparative Example 3 in which the crystal growth of a primary particle is promoted using a flux containing niobium instead of molybdenum, it can be confirmed that it exhibits initial charge/discharge capacities and a discharge capacity ratio, which are lower than those of the lithium secondary batteries using the positive electrode active materials according to Examples 1 to 3.

In other words, it can be confirmed that the above results are due to the degradation in charge-transfer and/or diffusion (i.e, surface kinetics) of Li ions on the surface of a primary particle is mitigated and/or prevented by promoting the crystal growth of a primary particle constituting a lithium manganese-based oxide using a molybdenum-containing flux and inducing the electrical activation of $rLi_2Mn_{1-a}Mo_aO_3$ corresponding to a C2/m phase due to the presence of some of the molybdenum used as the flux in the lithium manganese-based oxide as a dopant or on the surface of the primary particle as an oxide.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

The invention claimed is:

1. A positive electrode active material, comprising
a lithium-rich lithium manganese-based oxide containing at least lithium, nickel, manganese and molybdenum,
wherein the lithium manganese-based oxide is an overlithiated layered oxide that exists as a solid solution of a C2/m phase and a R3-m phase,
wherein the lithium manganese-based oxide comprises at least one primary particle,
wherein a crystal growth of the primary particles is promoted using a molybdenum-containing flux,
wherein the average particle diameter of the primary particle in the lithium manganese-based oxide is 0.4 to 0.9 μm, and wherein the lithium manganese-based oxide comprises the molybdenum as a dopant,
wherein the lithium manganese-based oxide is represented by Formula 1 below:

$$rLi_2Mn_{1-a}Mo_aO_3 \cdot (1-r)Li_bNi_xCo_yMn_zMo_{z'}\cdot M1_{1-(x+y+z+z')}O_2 \quad \text{[Formula 1]}$$

wherein,

M1 is at least one selected from Nb, Fe, Cr, V, Cu, Zn, Sn, Mg, Ru, Al, Ti, Zr, B, Na, K, Y, P, Ba, La, Ga, Gd, Sm, Ca, Ce, Ta, Sc, In, S, Ge, Si and Bi, $0<r\leq0.7$, $0\leq a<0.2$, $0<b\leq1$, $0<x\leq1$, $0\leq y<1$, $0<z<1$, $0<z'<0.2$, and $0<x+y+z+z'\leq1$.

2. The positive electrode active material of claim 1, which comprises 0.02 to 5.0 mol % of the molybdenum based on all metal elements, except lithium, in the lithium manganese-based oxide.

3. The positive electrode active material of claim 1, wherein a press density of the positive electrode active material under a pressure of 4.5 tons is 2.8 g/cc or more.

4. The positive electrode active material of claim 1, wherein at least one metal oxide selected from molybdenum oxide and lithium molybdenum oxide is present on at least a part of the surface of the lithium manganese-based oxide.

5. The positive electrode active material of claim 1, wherein at least one metal oxide represented by Formula 2 below is present on at least a part of the surface of the lithium manganese-based oxide, $$Li_dM2_eO_f \quad \text{[Formula 2]}$$

Wherein,

M2 is at least one selected from Ni, Mn, Co, Fe, Cu, Nb, Mo, Ti, Al, Cr, Zr, Zn, Na, K, Ca, Mg, Pt, Au, P, Eu, Sm, W, Ce, V, Ba, Ta, Sn, Hf, Gd and Nd, $0\leq d\leq8, 0<e\leq8$, and $2\leq f\leq13$.

6. A positive electrode comprising the positive electrode active material of claim 1.

7. A lithium secondary battery comprising the positive electrode of claim 6.

* * * * *